(12) United States Patent
Chiang et al.

(10) Patent No.: US 8,156,834 B2
(45) Date of Patent: Apr. 17, 2012

(54) LINEAR ACTUATOR HAVING QUICK-RELEASE MECHANISM

(75) Inventors: Hsin-An Chiang, Taichung (TW); Jin-Cheng Lin, Taichung (TW)

(73) Assignee: Hiwin Mikrosystem Corp., Taichung Industrial Park, Taichung (TW)

( * ) Notice: Subject to any disclaimer, the term of this patent is extended or adjusted under 35 U.S.C. 154(b) by 515 days.

(21) Appl. No.: 12/381,976

(22) Filed: Mar. 18, 2009

(65) Prior Publication Data
US 2010/0236343 A1 Sep. 23, 2010

(51) Int. Cl.
*F16H 27/02* (2006.01)
(52) U.S. Cl. ........................ 74/89.39
(58) Field of Classification Search .......... 74/89.13, 74/89.38, 89.39, 417, 423; 49/340, 341
See application file for complete search history.

(56) References Cited

U.S. PATENT DOCUMENTS

| 4,056,984 | A * | 11/1977 | Kenealy | 74/89.38 |
| 7,000,353 | B2 * | 2/2006 | Bosio | 49/139 |
| 7,533,591 | B2 * | 5/2009 | Wang | 74/89.39 |

FOREIGN PATENT DOCUMENTS

EP 577541 A1 * 1/1994

* cited by examiner

*Primary Examiner* — Vicky Johnson
(74) *Attorney, Agent, or Firm* — Charles E. Baxley

(57) ABSTRACT

A linear actuator with a quick-release mechanism allows the unpowered, loaded linear actuator to immediately return to its initial position by operating a rotatable involute cam of the quick-release mechanism. The quick-release mechanism is connected with a remote monitoring system so the current position of the linear actuator can be detected from a distant place.

7 Claims, 7 Drawing Sheets

LINEAR ACTUATOR HAVING QUICK-RELEASE MECHANISM

BACKGROUND OF THE INVENTION

1. Technical Field

The present invention relates to linear actuators. More particularly, the present invention relates to a linear actuator equipped with a quick-release mechanism.

2. Description of Related Art

The function principle of a linear actuator is that, in the main, a screw is rotated by a power source and in turn drives a nut screwed thereon to move a transmission part that carries a workpiece so that the workpiece can be linearly displaced. Such linear actuator can be extensively applied to beds, chairs, tables, vertical translation stages, power windows and so on. The velocity of the linear actuator is subject to the motor speed and the lead of the screw and therefore it takes time for the linear actuator to prepare for the movement of linear extension or contraction. However, the linear actuator is required to perform a quick contraction often and often. For instance, when the bed or chair where the linear actuator applied to is required to promptly return to an initial position thereof, the contracting flight of the linear actuator controlled by the motor and screw is generally inferior to expectation. For remedying this problem, a quick-release mechanism has been equipped to the linear actuator.

SUMMARY OF THE INVENTION

One objective of the present invention is to provide a linear actuator having a quick-release mechanism. The quick-release mechanism allows the unpowered, loaded linear actuator to immediately return to its initial position by gravity.

According to one concept of the present invention, the quick-release mechanism may be connected with a remote monitoring system so the current position of the linear actuator can be detected from a distant place.

The linear actuator of the present invention implements a mechanical clutch assembly to achieve a quick-release function. The disclosed linear actuator comprises:

a motor, driving a reduction gear that includes a transmission shaft, wherein the transmission shaft has a non-circular sectional shape;

a screw, coupled with a transmission component that included a linking shaft attached to a bottom thereof, wherein the linking shaft has a non-circular sectional shape; and a quick-release mechanism, detachably connecting the transmission shaft with the linking shaft so as to enable or dismiss a power connection between the motor and the screw;

wherein, the quick release mechanism comprises:

a tubular coupler, having an outer surface formed with a flange and an inner surface including a driving segment and an idle segment, wherein the driving segment having a non-circular sectional shape and the idle segment having a circular sectional shape are intercommunicated while the flange is formed adjacent to the driving segment;

a spring, externally abutting against the coupler at an outer surface of the flange so as to normally push along an axial direction of the coupler; and a rotatable involute cam, having a small-diameter segment and a large-diameter segment for connecting an inner surface of the flange, so that when rotated, the involute cam displaces the coupler to press or release the spring.

According to the previously described structure, when the quick-release mechanism is in a normal position, the involute cam contacts the flange with the small-diameter segment and the spring is in a normally extended position. At this time, the transmission shaft and the linking shaft are both received in the driving segment of the coupler and the power connection between the motor and the screw is enabled. On the other hand, when the involute cam is rotated to make the quick-release mechanism move to a release position, the involute cam contacts the flange with the large-diameter segment and the spring is in a pressed position. At this time, the transmission shaft is still received in the driving segment of the coupler while the linking shaft is corresponding to the idle segment of the coupler and thus the power connection between the motor and the screw is dismissed.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

While the present invention proposes a linear actuator for positioning control, the operational principles thereof are known to one skilled in the art and need not be discussed at any length herein. Meanwhile, the accompanying drawings referred to in the following description are provided for illustrative purposes and need not to be made to scale.

The linear actuator of the present invention implements a mechanical clutch assembly to achieve a quick-release function. Please refer to FIG. 1 for an exploded view of a linear actuator having a quick-release mechanism according to the present invention. The linear actuator primarily comprises a motor 10 and a screw 20 that are detachably connected with each other via the quick-release mechanism 30. In other words, a power connection between the motor 10 and the screw 20 may be enabled or dismissed by operating the quick-release mechanism 30.

Figure 1:
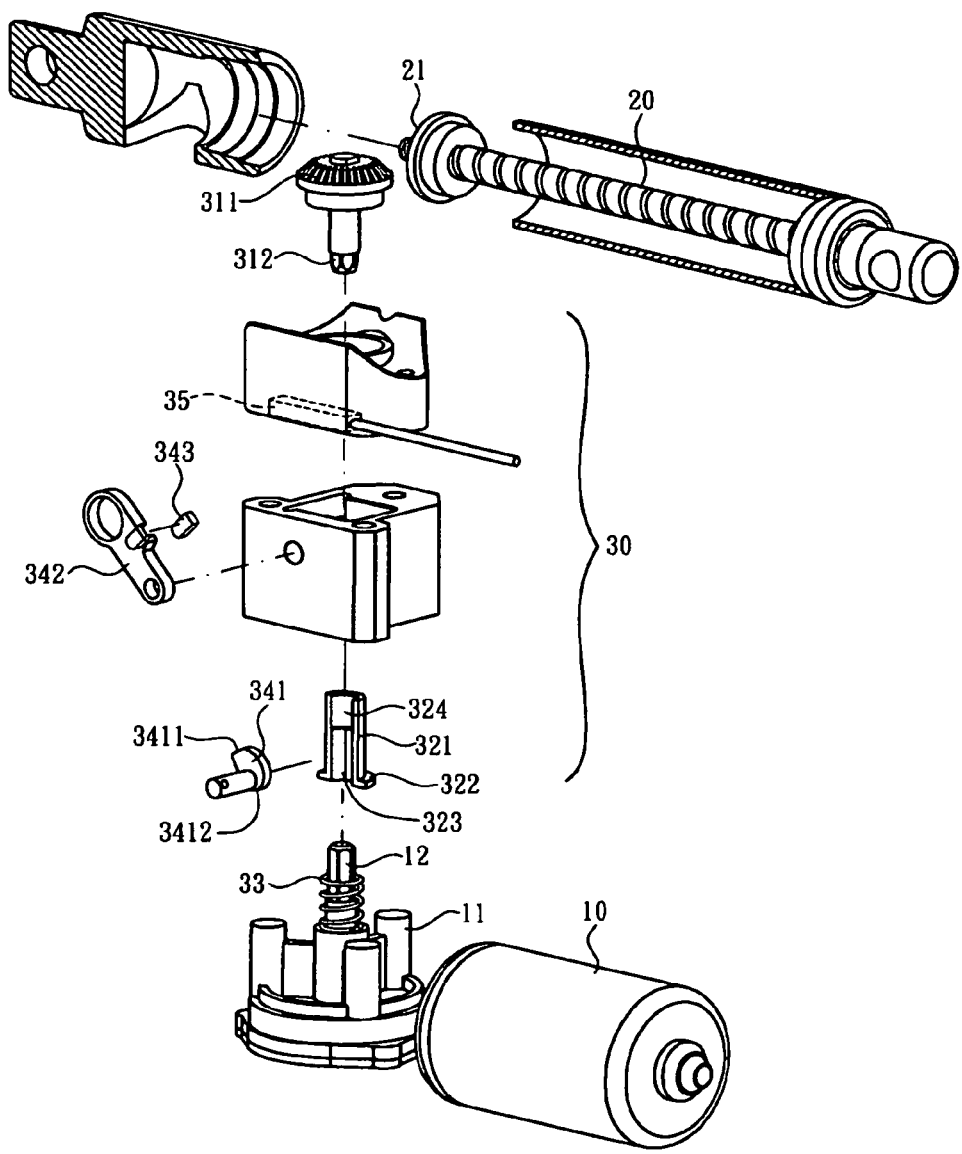
FIG. 1 is an exploded view of a linear actuator having a quick-release mechanism according to the present invention.
Figure 2:
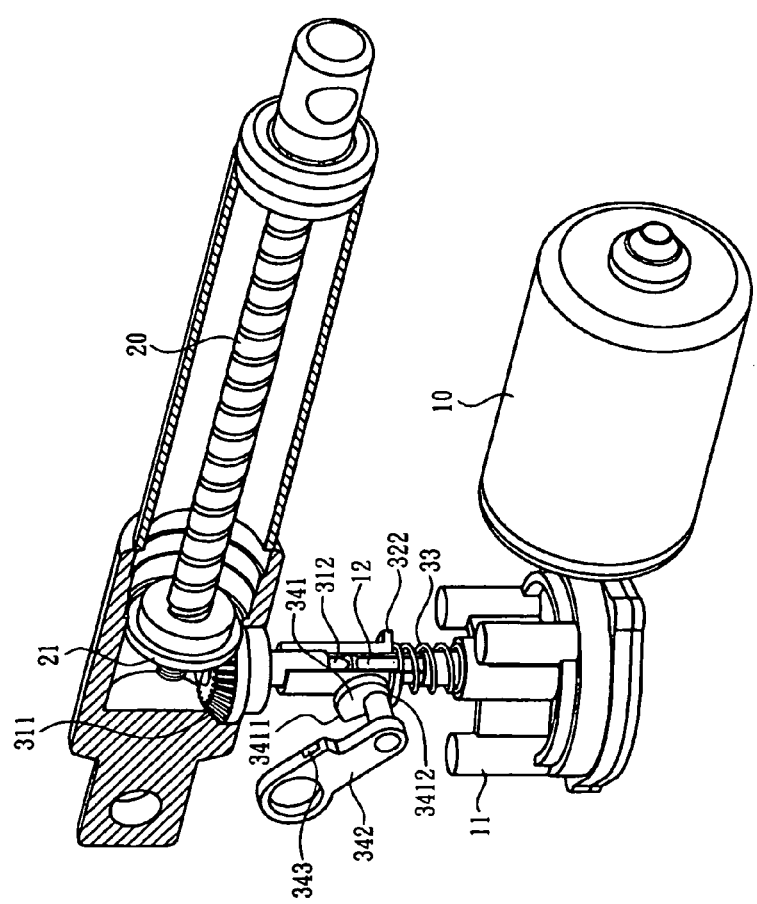
FIG. 2 is a perspective view of the linear actuator of FIG. 1, wherein the quick-release mechanism is sectioned for showing its normal position.
Figure 3:
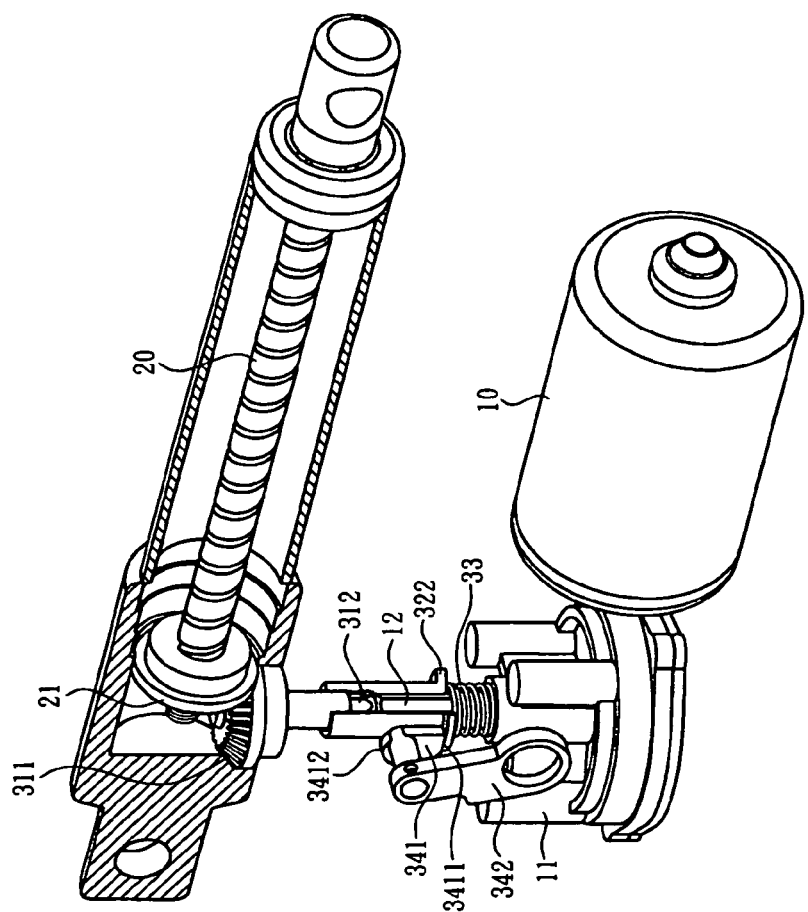
FIG. 3 is also a perspective view of the linear actuator of FIG. 1, wherein the quick-release mechanism is sectioned for showing its release position.
Figure 4:
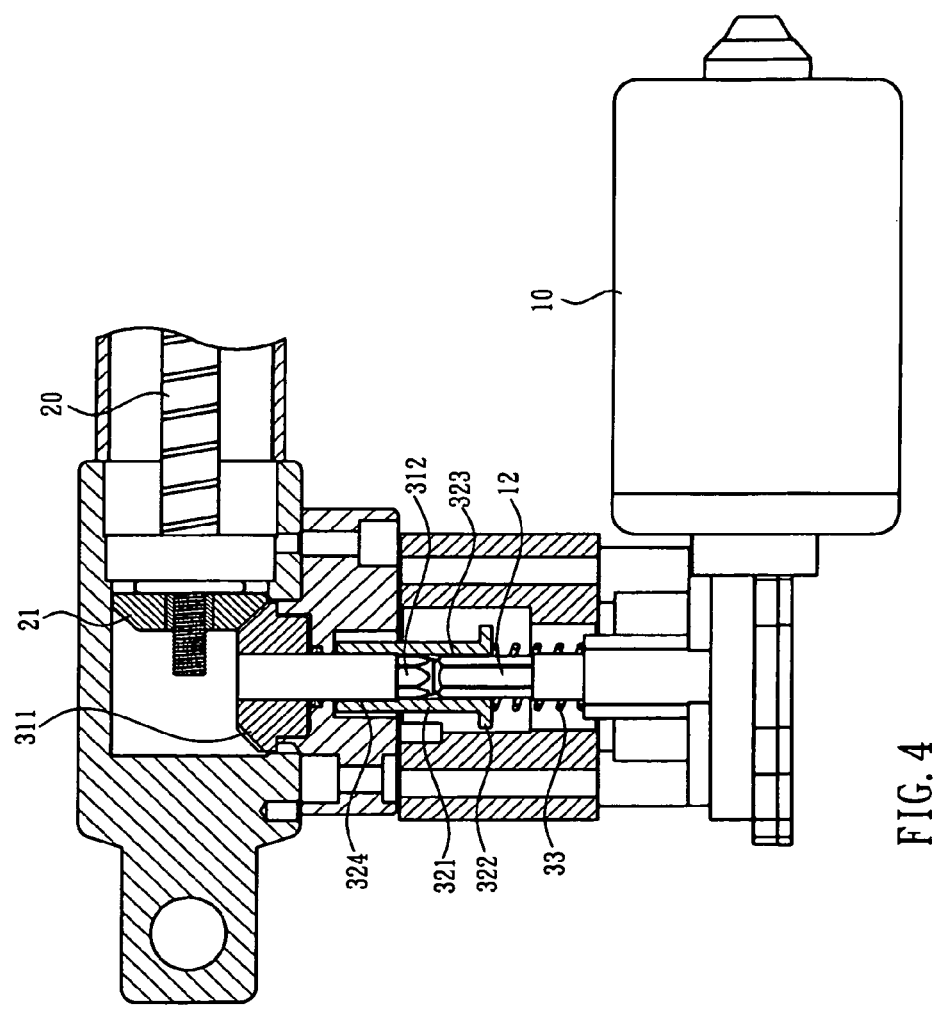
FIG. 4 is a sectional view of the linear actuator, wherein the quick-release mechanism is in its normal position.
Figure 5:
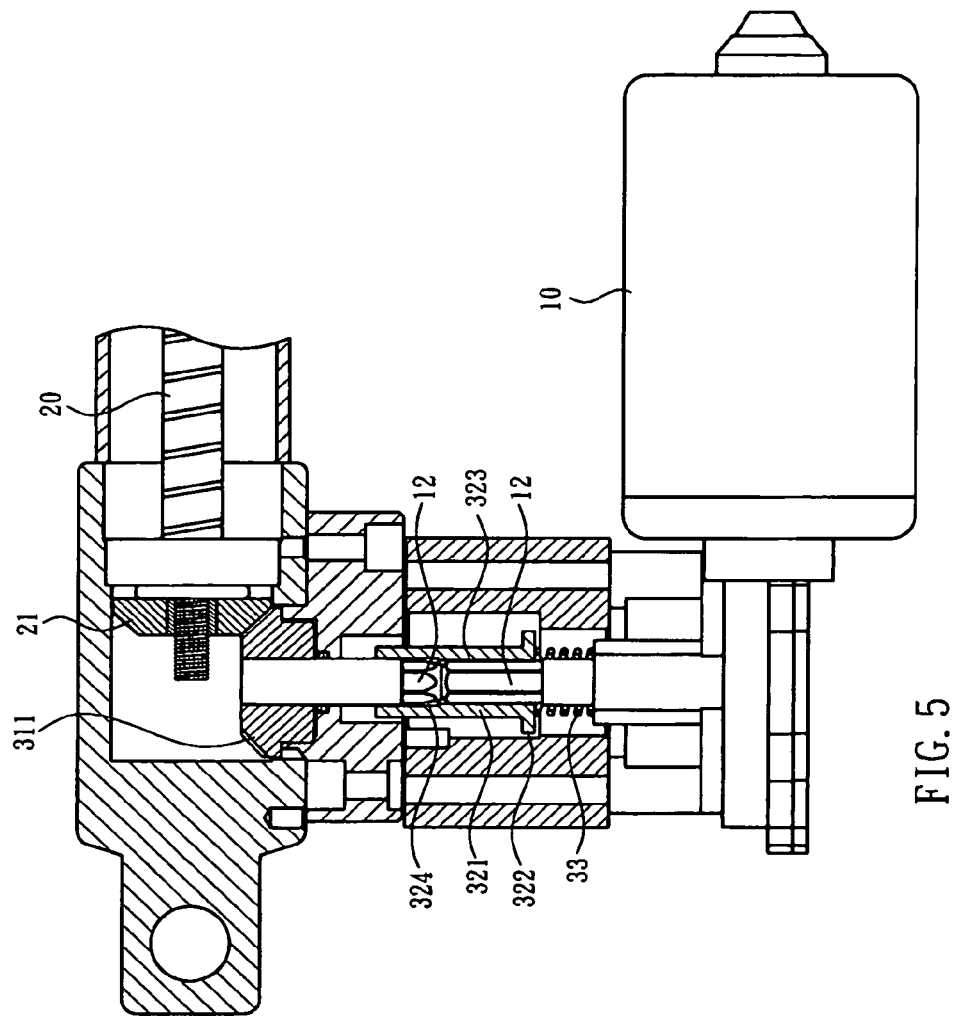
FIG. 5 is a sectional view of the linear actuator, wherein the quick-release mechanism is in its release position.

Referring to FIGS. 1, 2 and 4, the motor 10 serves to provide a power to a reduction gear 11 so as to drive a transmission shaft 12 of the reduction gear 11. Therein, the transmission shaft 12 has a non-circular sectional shape. According to the present embodiment, the non-circular sectional shape is a hexagonal sectional shape.

The screw 20 for driving an external workpiece has a bevel gear 21. The bevel gear 21 couples with another bevel gear 311 formed atop a linking shaft 312. The linking shaft 312 also has the hexagonal sectional shape.

Particularly, the linking shaft 312 and the transmission shaft 12 have the same hexagonal sectional shape.

The quick-release mechanism 30 includes a coupler 321. The coupler 321 is a tubular element and has an outer surface formed with a flange 322 while having an inner surface including a driving segment 323 and an idle segment 324 that are intercommunicated. The driving segment 323 has a non-circular sectional shape and the idle segment 324 has a circular sectional shape. According to the present embodiment, the flange 322 is formed adjacent to the driving segment 323 and distant from the idle segment 324. Meantime, a shown in the drawings, the non-circular sectional shape of the driving segment 323 has also the same hexagonal sectional shape but is slightly larger than the linking shaft 312 and the transmission shaft 12 for fittedly receiving the linking shaft 312 and the transmission shaft 12 therein. In the present embodiment, when the linking shaft 312 and the transmission shaft 12 are received in the tubular coupler 321 and corresponding to a respective end of the coupler 321, the flange 322 is relatively adjacent to the transmission shaft 12 and relatively distant from the linking shaft 312. When the driving segment 323 accommodates the linking shaft 312 and the transmission shaft 12 simultaneously, the movement of each of the coupler 321, the linking shaft 312 and the transmission shaft 12 can drive the other two.

The quick-release mechanism 30 further comprises a spring 33, such as a compression spring. The spring 33 externally abuts against the coupler 321 at an outer surface of the flange 322 so as to normally provide a pushing force along an axial direction of the coupler 321 toward the driving segment 323 of the coupler 321. In the present embodiment, the spring 33 is mounted around the transmission shaft 12 and normally pushes the flange 322 of the coupler 321 toward the linking shaft 312.

Additionally, the quick-release mechanism 30 has a rotatable involute cam 341. The involute cam 341 has a large-diameter segment 3411 and a small-diameter segment 3412. According to the present invention, when the quick-release mechanism 30 is in a normal position thereof, the involute cam 341 has the small-diameter segment 3412 closely contacting the flange 322 so that the large-diameter segment 3411 is relatively far from the flange 322.

Moreover, a puller 342 is connected with the involute cam 341. When the puller 342 is pulled, the involute cam is rotated with respective to the flange 322 of the coupler 321.

As can be seen in FIGS. 2 and 4, in the aforementioned normal position, the small-diameter segment 3412 of the involute cam 341 closely contacts the flange 322 and the spring 33 is normally extended without being pressed. Consequently, the transmission shaft 12 and the linking shaft 312 are both received in the driving segment 323 of the coupler 321. At this normal position, when the motor 10 rotates the transmission shaft 12 through the reduction gear 11, in virtue of the fittedly matching hexagonal sectional shapes of the transmission shaft 12 and the driving segment 323 of the coupler 321, the transmission shaft 12 drives the coupler 321. Then, similarly, the coupler 321 drives the linking shaft 312 to rotate. As a result, rotation of the bevel gear 311 on the linking shaft 312 leads to rotation of the bevel gear 21 of the screw, thereby the linear actuator working as normally expected to displace the workpiece. When the motor 10 later stops operating, the screw 20 is still restricted by the transmission shaft 12 through the bevel gear 21, the bevel gear 311, the linking shaft 312, and the coupler 321 so that the workpiece at the distal end of the screw 20 can be held at the currently achieved location.

In a state of emergency where the linear actuator has to be returned to its initial position, the quick-release mechanism 30 can be operated by pulling the puller 342. In the present embodiment, when the puller 342 is pulled clockwise, the involute cam 341 rotates to draw the large-diameter segment 3411 close to the flange 322 of the coupler 321. Correspondingly, the flange 322 is gradually pushed by the involute cam 341 to compress the spring 33. At this time, the displaced driving segment 323 of the coupler 321 dies not correspond to the linking shaft 312 any more. Instead, the coupler 321 receives the linking shaft 312 in the circular-sectional-shaped idle segment 324. Since the hexagonal sectional shape of the linking shaft 312 and the circular sectional shape of the idle segment 324 do not engage with each other, the linking shaft 312 is freed from the restriction provided by the coupler 321 and allowed to rotate independent from the driving shaft 12. Consequently, the screw 20 of the linear actuator can return to its initial position under the weight of the workpiece, thereby providing the desired quick release function.

Figure 6:
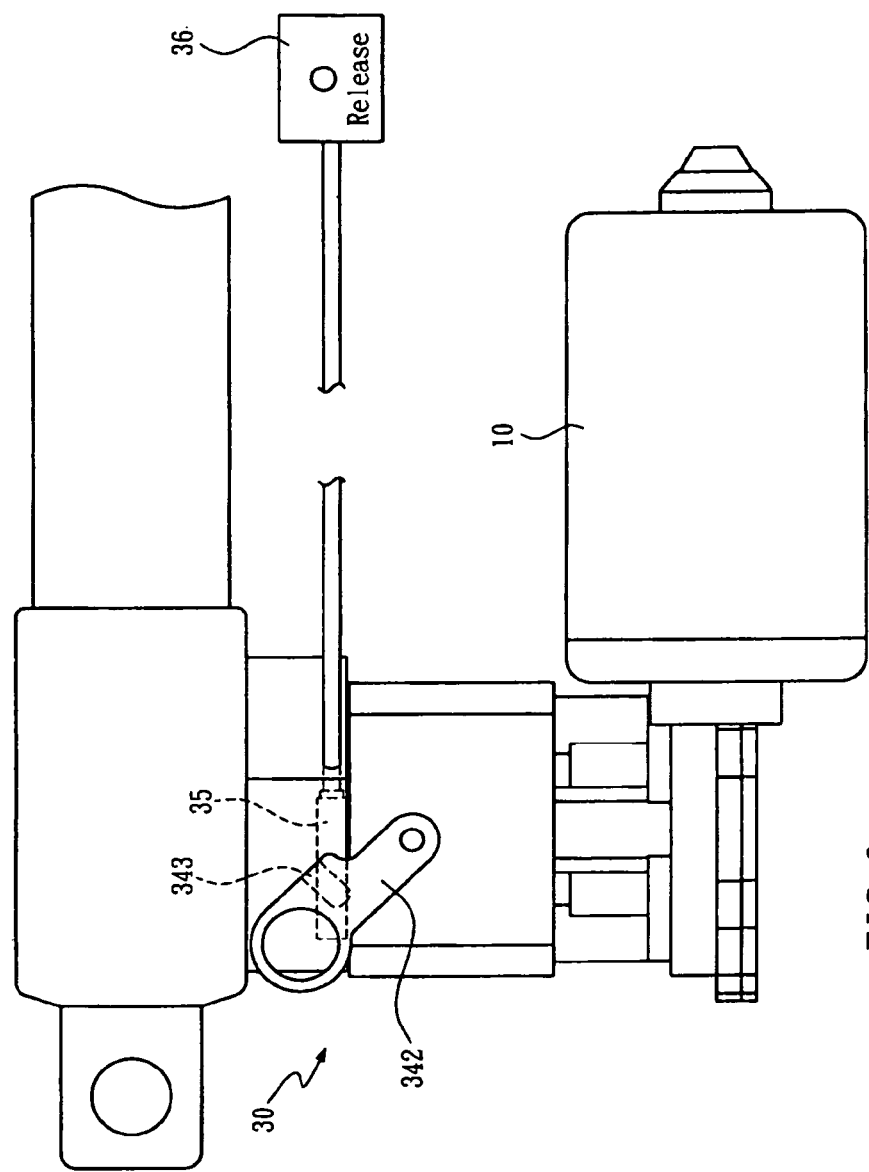
FIG. 6 is a side view of the linear actuator, wherein the quick-release is in its normal position.
Figure 7:
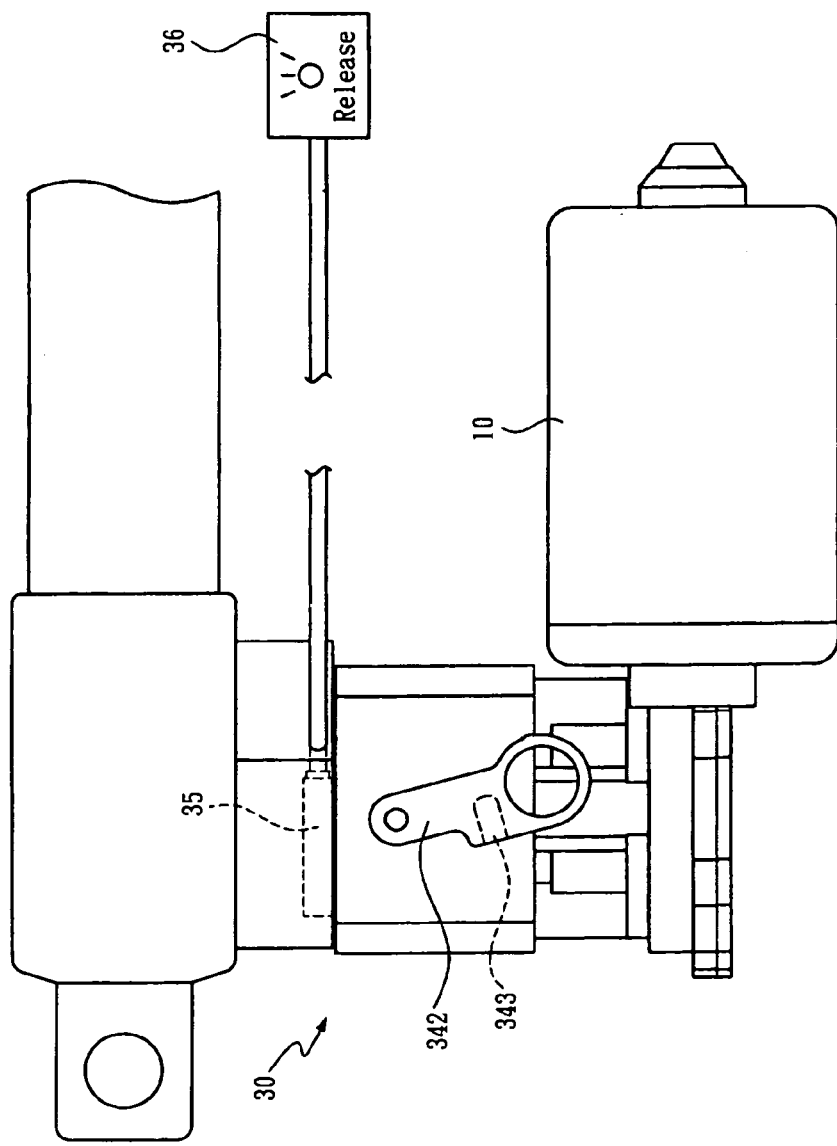
FIG. 7 is a side view of the linear actuator, wherein the quick-release is in its release position.

Basing on the previously described structure, the quick-release mechanism 30 of the present invention may further comprise a remote monitoring system. The remote monitoring system includes a magnetic member 343 settled on the puller 342, a reed switch 35 settled near the coupler 321, and a display device 36 settled at a distant place. Thereby, when the quick-release mechanism 30 is in the normal position as shown in FIG. 6, the reed switch 35 senses the magnetic member 343 and stays idle. On the other hand, when the puller 342 is pulled and the quick-release mechanism 30 is operated as shown in FIG. 7, the pulled puller 342 brings the magnetic member 343 away from the reed switch 35. Consequently, when the reed switch 35 detects the displacement of the magnetic member 343, namely a relative positional variation between the magnetic member 343 and the reed switch 35, a signal is output to the display device 36 so that the remote monitoring system allows the current position of the linear actuator to be detected from the distant place, thereby improving safety and convenience of the linear actuator.

Although a particular embodiment of the invention has been described in detail for purposes of illustration, it will be understood by one of ordinary skill in the art that numerous variations will be possible to the disclosed embodiments without going outside the scope of the invention as disclosed in the claims.

What is claimed is:

1. A linear actuator having a quick-release mechanism, the linear actuator comprising:

a motor driving a transmission shaft to rotate through a reduction gear, wherein the transmission shaft has a non-circular sectional shape;

a screw coupled with a transmission component that included a linking shaft attached to a bottom thereof, wherein the linking shaft has a non-circular sectional shape; and the quick-release mechanism detachably connecting the transmission shaft with the linking shaft so as to enable or dismiss a power connection between the motor and the screw;

wherein, the quick release mechanism comprises:

a tubular coupler having an outer surface formed with a flange and an inner surface including a driving segment and an idle segment, wherein the driving segment having a non-circular sectional shape and the idle segment having a circular sectional shape are intercommunicated while the flange is formed adjacent to the driving segment;

a spring externally abutting against the coupler at an outer surface of the flange so as to normally push along an axial direction of the coupler; and a rotatable involute cam having a small-diameter segment and a large-diameter segment for connecting an inner surface of the flange, so that when rotated, the involute cam displaces the coupler to press or release the spring;

whereby, when the quick-release mechanism is in a normal position, the involute cam contacts the flange with the small-diameter segment and the spring is in a normally extended position so that the transmission shaft and the linking shaft are both received in the driving segment of the coupler and the power connection between the motor and the screw is enabled, and when the involute cam is rotated to make the quick-release mechanism move to a release position, the involute cam contacts the flange with the large-diameter segment and the spring is in a pressed position, so that the transmission shaft is still received in the driving segment of the coupler while the linking shaft is corresponding to the idle segment of the coupler and thus the power connection between the motor and the screw is dismissed.

2. The linear actuator of claim 1, wherein the transmission component is a bevel gear to couple with another bevel gear provide on the screw.

3. The linear actuator of claim 1, wherein a puller is connected with the involute cam so that when the puller is pulled, the involute cam is driven to rotate.

4. The linear actuator of claim 3, wherein quick-release mechanism further is connected with a remote monitoring system that outputs a signal when the puller is pulled and the quick-release mechanism is in the release position.

5. The linear actuator of claim 4, wherein remote monitoring system comprises a magnetic member settled on the puller, a reed switch settled near the coupler, and a display device settled at a distant place so that when the reed switch detects a displacement of the magnetic member, namely a relative positional variation between the magnetic member and the reed switch, a signal is output to the display device so that the remote monitoring system allows the release position of the linear actuator to be detected from the distant place.

6. The linear actuator of claim 1, wherein the non-circular sectional shapes of the driving shaft, the linking shaft and the driving segment of the coupler are hexagonal.

7. The linear actuator of claim 1, wherein the spring is a compression spring.

* * * * *